United States Patent Office 3,557,174
Patented Jan. 19, 1971

3,557,174
PROCESS FOR PRODUCING HYDROCARBON ALUMINUM COMPOUNDS
Warren E. Becker, Paul Kobetz, and Gunnar E. Nelson, Baton Rouge, La., assignors to Ethyl Corporation, New York, N.Y., a corporation of Virginia
No Drawing. Continuation-in-part of application Ser. No. 633,411, Apr. 25, 1967. This application Nov. 4, 1969, Ser. No. 874,023
Int. Cl. C07f 5/06
U.S. Cl. 260—448          15 Claims

ABSTRACT OF THE DISCLOSURE

Improvements in reactions for producing organo aluminum compounds are described. The improvements involve halides of alkali metals as catalysts or activators for reactions involving aluminum with an organo aluminum compound and hydrogen or with olefin and hydrogen in the presence of an organo aluminum compound. Preferred catalytic halides are the fluorides. A preferred alkali metal constituent of the catalyst compounds is sodium; however, certain other compounds which are other combinations of other halogens, including psuedo halogens, with other alkali metals are also disclosed as useful catalysts. The preferred compounds are similar to the alkali metals in effectiveness and are much easier to handle and use.

CROSS REFERENCE TO RELATED APPLICATION

This application is a continuation-in-part of application S.N. 633,441, filed Apr. 25, 1967, now abandoned.

BACKGROUND OF THE INVENTION

Field of the invention

The invention relates generally to the manufacture of organo aluminum compounds such as trialkyl aluminum compounds, and alkyl aluminum hydrides.

Processes of the general nature of the present invention are disclosed in U.S. Pat. 3,050,540 using as catalysts organic compounds of alkali metals and alkaline earth metals. Additionally, U.S. Pat. 3,050,541 discloses catalysis or activation of aluminum reactions using alkali metals and alkaline earth metals, as well as their hydrides. Although the catalysis or activation of these two prior art patents is a very valuable and effective proposition, it has a disadvantage in that the handling of the alkali metals and the alkaline earth metals, of their hydrides and of organic compounds of these metals normally poses significant problems in what is a usual requirement for avoidance of moisture and oxygen. The present invention secures useful results with materials that are much more easily handled and less critical as to environment.

Processes wherein an organoaluminum compound is produced by reacting aluminum with an organoaluminum compound and hydrogen or with olefin and hydrogen in the presence of an organoaluminum compound are well known. See for example U.S. 2,787,626; 2,900,402; 2,930,-808; 3,000,919; 3,016,396; 3,032,574; 3,207,770; 3,207,-772; 3,207,773; and 3,207,774.

In accordance with the present invention, organoaluminum compounds are produced by reacting aluminum with an organoaluminum compound and hydrogen or with olefin and hydrogen in the presence of an organoaluminum compound employing catalysis of the reaction by a catalyst selected from the class consisting of compounds of halogens of atomic numbers from 9 to 17, both inclusive, and cyanates and cyanides of alkali metals of atomic numbers from 19 to 55, both inclusive.

The reaction is preferably conducted at temperatures of the order of about 100–200° C., preferably about 125–175° C., typically about 125° C., 150° C., 175° C. and 200° C. at pressures of hydrogen of the order of 200–5000 lbs., preferably from about 500 lbs. to about 4000 lbs., typically at pressures of 1000, 2000 and 3000 lbs./square inch gage. Preferred catalyst proportions (mol percent of the aluminum reacting) range from approximately $\frac{1}{10}$ of 1 percent up to about 10 percent, a more preferred range being from approximately five tenths of 1 percent up to about 5 percent, typically about $\frac{1}{2}$, 1 and 2 mol percent. Reaction times are important but not critical, useful reaction times generally ranging from about 1 to about 6 hours. In general, rarely is it necessary or desired to use reaction times in excess of approximately 4 hours; however, it is readily appreciated that separation and recycle problems are generally more significant with short reaction periods and low conversions so that where one is faced with a difficult situation in regard to separations, or for other reasons, there are advantages in longer reaction times.

The preferred catalysts of the present invention are described broadly as certain halides and psuedo-halides of certain alkali metals. For the various usable actual compounds or combinations of actual halogens, viz. fluorine, and chlorine, with alkali metals, viz. sodium, potassium, rubidium and cesium, a considerable difference in catalytic effectiveness versus cost is noted. The chlorine compounds, particularly sodium chloride, are generally less effective as catalysts than are the compounds of fluorine. The compounds of lithium and potassium are generally less desired than those of sodium on a cost-effectiveness basis and those of rubidium and cesium are even less desired from such a viewpoint, except in special applications. Preferred compounds are the fluorine and chlorine compounds of potassium, sodium fluoride and lithium fluoride. The most preferred catalyst of this group is sodium fluoride, which is extremely effective as a catalyst and which is also advantageous from a cost basis, readily available and comparatively easy to handle. In addition to the foregoing specifics, the materials known as psuedo halides, typically sodium cyanide and sodium cyanate, and similar compounds of other alkali metals, particularly those of potassium, are also useful catalysts for the purposes of the present invention. Thus, it is to be understood that within the broad range of materials suitable for performing the present invention these psuedo-halide materials are included, even though such psuedo-halides are compounds which do not actually contain halogen. In catalyst discussions and in the claims, certain elements are referred to in terms of atomic numbers. Those used correspond to the presentation in Fisher Scientific Company Periodic Charts of the Elements, typically the chart of 1955. For clarity, the alkali metals are identified as follows: 3-lithium, 11-sodium, 19-potassium, 37-rubidium, and 55-cesium. The halogens are identified as 9-fluorine, and 17-chlorine. It is known that the alkali metal halides herein discussed readily complex with organoaluminum compounds as herein defined so that in many instances complexes such as $Na[Al(C_2H_5)_3F]$ are formed. The process may be performed by feeding all or part of the reactants as preformed complexes of such general type, either freshly preformed or as recycle in repetitive operation.

The processes of this invention can be effectively used and combined with other processing to prepare a wide variety of different organoaluminum compounds including for example hydrocarbon aluminum hydrides, and trihydrocarbon aluminum compounds. Thus the organoaluminum compounds produced by the processes of this invention may be depicted by the formula $R_1R_2R_3Al$ wherein from 1 to 3 of $R_1$, $R_2$, and $R_3$ are hydrocarbon radicals as hereinafter defined, similar or different, and the balance, if any, are hydrogen. Each hydrocarbon radical may contain up to 40 or more carbon atoms. The invention is particularly well suited for the preparation of alkyl aluminum compounds, especially dialkyl aluminum hydrides, or aluminum trialkyls or mixtures of both.

The hydrocarbon radicals present in the products may be various radicals such as alkyl, cycloalkyl, alkenyl, aryl, aralkyl, alkaryl, cyclo alkenyl, alkynyl and like hydrocarbon radicals.

Of these a more preferred class is one wherein the hydrocarbon radicals are alkyl radicals or cycloalkyl radicals and are unsubstituted or have only hydrocarbon substituents. In general these are more useful as catalysts and as intermediates than are others of broader classification.

A further preferred class because of widespread utility, low cost and ease of reactivity with minimum side reactions and solubility problems is one wherein the hydrocarbon radicals are straight or branched chain alkyl radicals.

One class of products most highly preferred are those which can be produced by the addition of olefins to aluminum-hydrogen bonds of compounds such as aluminum hydride, alkyl aluminum hydrides, dialkyl aluminum hydrides and in displacement reactions with trialkyl aluminum compounds. Thus, products which can be produced by the readily reactable olefins such as straight chain and remotely branched alpha olefins ($R-CH=CH_2$) are particularly desirable together with products which can be obtained from the proximately branched (vinylidene) olefins

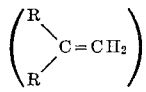

or the internal olefins $RCH=CHR$.

In general the addition of olefins can be accomplished during the principal reaction herein catalyzed as well as in a separate subsequent operation. In the latter the product of the principal reaction is usually a hydrocarbon aluminum hydride while in the former the product of the principal reaction is usually a trihydrocarbon aluminum. The olefin reacted in either event is usually preferably the same in carbon skeletal structure as the hydrocarbon radicals of the starting organo aluminum compound so as to lead to triorgano aluminum products wherein the organo radicals are the same or are similar statistically. On the other hand, deliberate variation is sometimes desired to provide mixed organo radicals in compounds or in masses of materials.

Typical products are divinyl ethyl aluminum, divinyl aluminum hydride, trioctenyl aluminum, triphenyl aluminum, ditolyl aluminum hydride, trixylyl aluminum, tribenzyl aluminum, di-para-tertiary butyl phenyl aluminum hydride, tris-(2 phenethyl) aluminum, tricumenyl aluminum, tris-(4 cyclohexenyl) aluminum, triheptynyl aluminum, tricitronellyl aluminum.

Other typical products are tri-cyclohexyl aluminum, dicyclohexyl aluminum hydride, tris-(dimethylcyclohexyl aluminum), tri-cyclopentyl aluminum, di-cyclopentyl aluminum hydride, cyclohexyl ethyl aluminum hydride, dicyclohexyl dodecyl aluminum, di-phenethyl aluminum hydride, bis-(omega phenyl dodecyl) aluminum hydride, tris-(omega phenyl amyl) aluminum, di-ethyl (omega phenyl hexyl) aluminum.

Other typical products are di-propyl aluminum hydride, tri-dodecyl aluminum, di-hexadecyl aluminum hydride, dioctyl aluminum hydride, di-cetyl pentyl aluminum, trioctadecyl aluminum, tris-(triacontyl) aluminum, ethyl butyl hexyl aluminum, dodecyl tetradecyl hexadecyl aluminum, ethyl propyl aluminum hydride, isobutyl propyl aluminum hydride, tris-(4-ethyl decyl) aluminum, tris-(2-ethyl hexyl) aluminum, tris-(4-nonyl) aluminum.

Generally speaking, it is preferable from the standpoint of widespread utility of the products and ease of manufacture to produce dialkyl aluminum hydrides and trialkyl aluminum compounds especially those containing 2 to about 20 carbon atoms in each alkyl group. To an even greater degree, those compounds having alkyl groups of 2 to 6 carbon atoms are especially preferred. Exemplary preferred alkyl compounds are diethyl aluminum hydride, triethyl aluminum, tripropyl aluminum, tri-n-butyl aluminum, di-n-butyl aluminum hydride, triisobutyl aluminum, diisobutyl aluminum hydride, trihexyl aluminum, dihexyl aluminum hydride, and the like.

The organo aluminum compounds used as reactants of the present process are exemplified by the aforementioned product organo aluminum compounds including $$R_1R_2R_3Al$$

and $$R_2R_2AlH$$

particularly the former, such as triethyl aluminum or diisobutyl aluminum hydride.

The olefins used as reactants in the present process are olefinic hydrocarbons having the carbon skeletal structure of one or more the $R_1R_2R_3$ groups of the product organo aluminum compounds.

Typical olefin reactants for the principal reaction or in a subsequent addition or displacement reaction are the following. Ethylene, propylene, butylene, isobutylene, pentene-1, hexene-1, octene-1, dodecene-1, hexadecene-1, eicosene-1, triacontene-1, hexene-2, octene-3, tetradecene-4, 2-ethyl butene-1, 3-ethyl octene-1, 2-ethyl hexene-1, cyclopentene, cyclohexene, 2,6-dimethyl-2,7-octadiene, 6-phenyl hexene-1, 5-phenyl pentene-1, 12-phenyl dodecene-1, hexadecene-1, and the like.

It is desirable to provide ample agitation or turbulence in the reaction system to insure thorough mixing of the reactants and intimate contact between the gaseous and liquid phases involved. If desired, suitable anhydrous solvents which do not adversely affect the desired reaction may be employed. Exemplary of such solvents are saturated aliphatic hydrocarbons (e.g., paraffinic hydrocarbons, cycloparaffinic hydrocarbons, or mixtures thereof), aromatic hydrocarbons, saturated fluorocarbons, silicone oils, and other similar materials which are inert to the reactants and the organo aluminum product. It is feasible, although ordinarily not recommended, to conduct the reaction in the presence of certain basic substances such as tertiary amines, ethers, or the like so long as there is an insufficient amount of such material present to complex with all of the organo aluminum compound(s) initially present in the system.

In preferred form, the various process embodiments of this invention are carried out in the absence of an ancillary solvent such as those referred to above. The reaction can be readily controlled in the absence of such solvents. Moreover, the lack of an ancillary solvent means that the reactors need not be seized to accommodate such materials.

For the best results, clean, essential anhydrous particulate aluminum of the make-up described herein is employed. Inasmuch as the reaction should be conducted in an essentially anhydrous environment, it is desirable to insure that the aluminum fed to the process is itself free from excessive moisture. In addition, the aluminum should be essentially free from any oily residue, dirt, soil or other extraneous contaminants which would tend to interfere with intimate contact between the aluminum and the other reactants being used.

Although the size of the particulate aluminum is not critical, it is generally desirable that the particle range in size from fine particles up to about 4 mesh. This enables the achievement of the most rapid reaction rates. It will be clearly understood and appreciated, however, that even larger sized particulate aluminum may be successfully used in the practice of this invention.

Ordinary commercial aluminum, particularly casting grades that are of low cost because of the avoidances of "high-purity" purification techniques, is suitable for use in the present invention. In many instances scrap or reclaimed aluminum is an excellent form. In some instances the reactivity of high purity aluminum may be enhanced by the deliberate back-addition of conventional contaminants pointed out in U.S. Pat. 3,104,252 or British Pat. 1,044,735.

The organoaluminum compounds which can be prepared by the process of this invention are to know utility as ingredients for polymerization catalysts and as chemical intermediates in the production of olefins, alcohols, and other valuable products. For further details, reference may be made to the patent literature, including the disclosures of the U.S. patents cited above.

EXAMPLE I 35 grams (1.3 mols) of aluminum powder of approximately 99.9 percent purity, 87.5 ml. of triethyl aluminum (0.6 mol) and 14.6 millimols of sodium fluoride were added to a 300 ml. autoclave equipped with a separate but connected reservoir of 500 ml. capacity, the system pressured with hydrogen to 990 p.s.i.g. and heated to about 150° C. and maintained from 148–152° C. for 85 minutes. Hydrogen uptake rate was measured as rate of pressure drop in the system and plotted versus time. The rate was a maximum at 5.5 pounds per minute pressure drop for a short period of time after 20 minutes. In a duplicate run the rate maximum was 7.8 pounds per minute pressure drop at 33 minutes.

EXAMPLE II

Example I was repeated in duplicate runs using 14.6 millimols of sodium as the catalyst. The maximum hydrogen uptake rates for the two runs (pressure drop rate) were 4.2 and 3.6 pounds pressure drop per minute at 18 and 23 minutes, respectively.

EXAMPLE III

Example I was repeated with 14.6 millimols of lithium fluoride as the catalyst. The maximum hydrogen uptake rate (pressure drop rate) was 3.2 pounds pressure drop per minute at 42 minutes.

EXAMPLE IV

Example I was repeated with 14.6 millimols of sodium chloride as the catalyst. The maximum hydrogen uptake rate as above was 1.6 pounds pressure drop per minute at 82 minutes.

EXAMPLE V

Example I was repeated with 14.6 millimols of potassium fluoride as catalyst. The maximum hydrogen uptake rate as above was 2.0 pounds pressure drop per minute at at 47 minutes.

EXAMPLE VI

Example I was repeated with 14.6 millimols of potassium chloride as catalyst. The maximum hydrogen uptake rate as above was 2.0 pounds pressure drop per minute at 90 minutes.

EXAMPLE VII

Example I is repeated with good results with various catalyst systems in the group: lithium fluoride, lithium bromide, lithium iodide, lithium cyanide, lithium cyanate; sodium fluoride, sodium bromide, sodium iodide, sodium cyanide, sodium cyanate; potassium fluoride, potassium chloride, potassium bromide, potassium iodide, potassium cyanide, potassium cyanate; rubidium fluoride, rubidium chloride, rubidium bromide, rubidium iodide, rubidium cyanide, rubidium cyanate; cesium fluoride, cesium cyanate. Catalyst proportions are from about 0.1 percent to 10 percent by weight based on the aluminum. Temperatures are from about 100 to about 200° C. Pressures are from about 200 to about 5000 pounds per square inch gage. Reaction times are from about 1 to 6 hours.

EXAMPLE VIII

Example VII is repeated with alkali metal addition to the reactants to produce hydride mixed metal compounds.

EXAMPLE IX

Examples VII and VIII are repeated with olefins in the reactants to form aluminum-alkyl bonds in place of at least part of the aluminum-hydrogen bonds.

EXAMPLE X

Products of the foregoing examples containing aluminum-hydrogen bonds are reacted with olefins in a subsequent reaction to decrease the percentage of aluminum-hydrogen bonds present, and increase the percentage of aluminum-alkyl bonds present.

EXAMPLE XI

An equal molar mixture of 0.1 mol (27 grams) cyclohexyl aluminum and 0.1 mol (11.4 grams) triethyl aluminum are reacted with 0.3 mol (8.1 grams) aluminum powder in a stirred autoclave with hydrogen at 1000 p.s.i.g., and 150° C. Cyclohexylethylaluminum hydride is produced in good yield.

EXAMPLE XII 32.4 grams (0.3 mol) of trivinyl aluminum, 16.2 grams (0.6 mol) of aluminum powder, 3.5 grams (0.084 mol) of sodium fluoride and 100 milliliters toluene are added to a 300 milliliter vigorously stirred autoclave. The contents are heated to 150° C. and the autoclave is pressurized to 1000 p.s.i.g. with hydrogen. After 3 hours, the autoclave is cooled to room temperature, excess hydrogen vented and the solution analyzed. Nuclear Magnetic Resonance analyses in a standard phenetole solution confirm the production of divinyl aluminum hydride, corresponding to approximately 0.4 mol.

EXAMPLE XIII 189 grams (7.0 mols) of aluminum powder, 79.8 grams (0.7 mol) of triethyl aluminum and 4.2 grams (0.1 mol) of sodium fluoride are added to a 1-liter stirred autoclave. The autoclave is heated to 150° C. and maintained at 148–152° C. Equivalent quantities of hydrogen and ethylene (1 mol of $H_2$ per 2 mols of $C_2H_4$) are added to bring the system to a total pressure of 1000 p.s.i.g. and maintain that pressure. After 3 hours, the bomb is cooled. Two layers are obtained.

The top layer contains approximately 300 grams (2.6 mol) of $Et_3Al$ and is decanted. In an alternate procedure, the triethyl aluminum is removed by distillation.

The bottom layer contains approximately 135 grams (about 5 mols) of aluminum and 0.1 mol of

$NaAlEt_3F \cdot Et_3Al$ complex. The aluminum and the unresolved catalyst in the complex $NaAlEt_3F \cdot Et_3Al$, along with about 90 ml. of triethyl aluminum and additional makeup aluminum are recycled in a subsequent similar run to make additional triethyl aluminum.

In this recycle the complex is a convenient carrier of the sodium fluoride catalyst.

We claim:
1. In a process wherein a hydrocarbon aluminum compound is produced by reacting aluminum with a hydrocarbon aluminum compound and hydrogen or with olefin and hydrogen in the presence of a hydrocarbon aluminum compound, the improvement which comprises catalyzing the reaction by a catalyst selected from the class consisting of compounds of halogens of atomic numbers from 9–17, both inclusive, and cyanates and cyanides, of lithium, sodium, potassium, rubidium and cesium.

2. The process improvement of claim 1 wherein the catalyst is sodium fluoride.

3. The process improvement of claim 1 wherein the catalyst is sodium cyanide.

4. The process improvement of claim 1 wherein the catalyst is sodium cyanate.

5. The process improvement of claim 1 wherein the catalyst is potassium fluoride.

6. The process improvement of claim 1 wherein the catalyst is potassium chloride.

7. The process of claim 1 wherein the reaction temperature is from about 100 to about 200° C., the pressure is from about 200 to about 5000 pounds per square inch gage, the catalyst proportion is from about 0.1 to about 10.0 percent by weight based on the aluminum.

8. The process of claim 1 wherein the reaction temperature is from about 125 to about 175° C., the pressure is from about 500 to about 4000 pounds per square inch gage, the catalyst proportion is from about 0.5 to about 5.0 percent by weight based on the aluminum.

9. The process of claim 1 wherein are reacted aluminum, a hydrocarbon aluminum compound and hydrogen, the catalyst is sodium fluoride, and the reaction temperature is about 150° C.

10. The process of claim 1 wherein are reacted aluminum, triethyl aluminum and hydrogen, the catalyst is sodium fluoride and the reaction temperature is about 150° C.

11. The process of claim 1 wherein are reacted aluminum, hydrogen, and olefin in the presence of a hydrocarbon aluminum compound.

12. The process of claim 1 wherein are reacted aluminum, hydrogen and ethylene in the presence of triethyl aluminum to form triethyl aluminum.

13. The process of claim 1 wherein the hydrocarbon constituents of the hydrocarbon aluminum compounds are alkyl radicals or cycloalkyl radicals.

14. The process of claim 13 wherein the alkyl radicals are straight or branched chain.

15. The process of claim 14 wherein the alkyl radicals are straight chain, each having from 2 to about 6 carbon atoms.

References Cited

UNITED STATES PATENTS

| | | | |
|---|---|---|---|
| 3,104,252 | 9/1963 | Radd et al. | 260—448 |
| 3,382,269 | 5/1968 | Williams et al. | 260—448 |

OTHER REFERENCES

Zeiss: Organometallic Chemistry, Reinhold Publ. Corp., New York (1960), pp. 195–6.

TOBIAS E. LEVOW, Primary Examiner

H. M. S. SNEED, Assistant Examiner